C. L. McKESSON & B. F. RICE.
APPARATUS FOR SIZING OR VOLUMETRIC GRADING OF MATERIALS.
APPLICATION FILED MAR. 10, 1914.
1,135,123.
Patented Apr. 13, 1915.
9 SHEETS—SHEET 4.
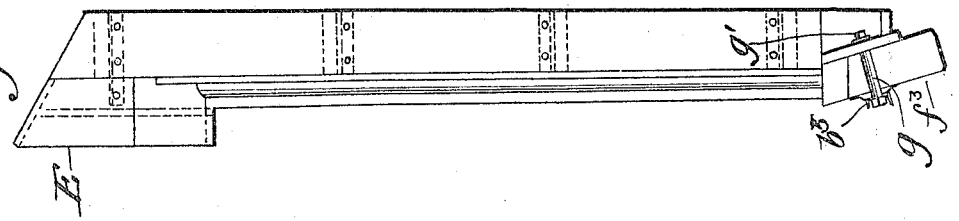
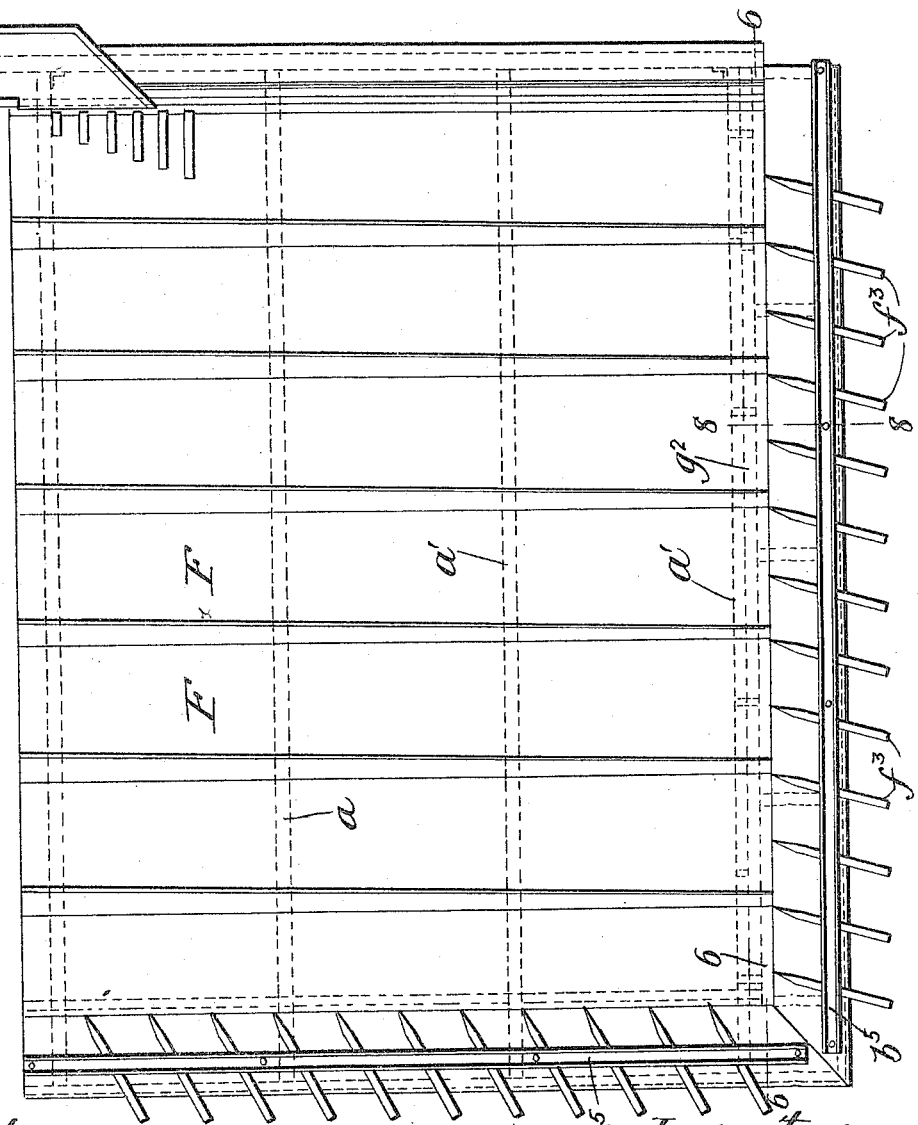

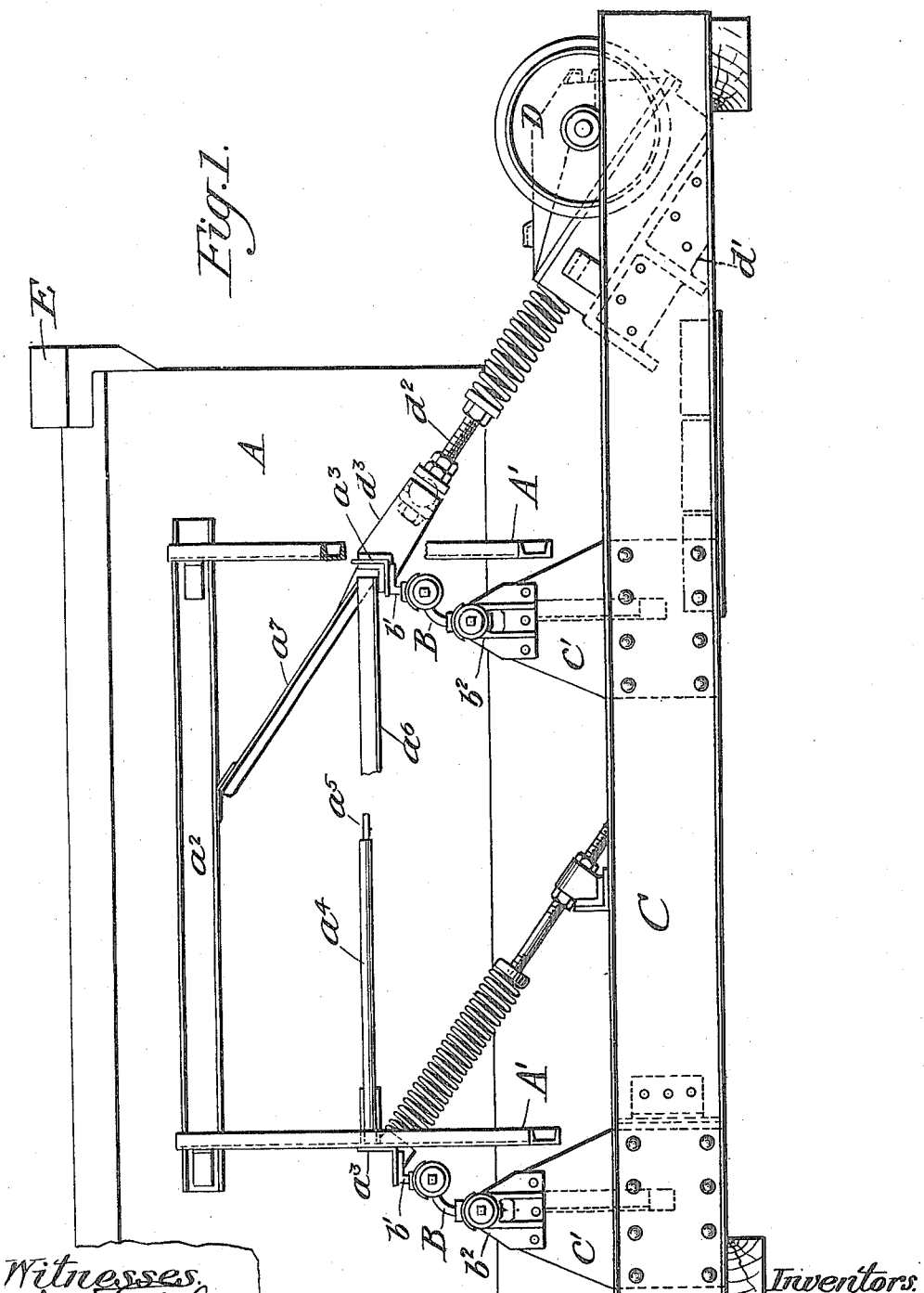

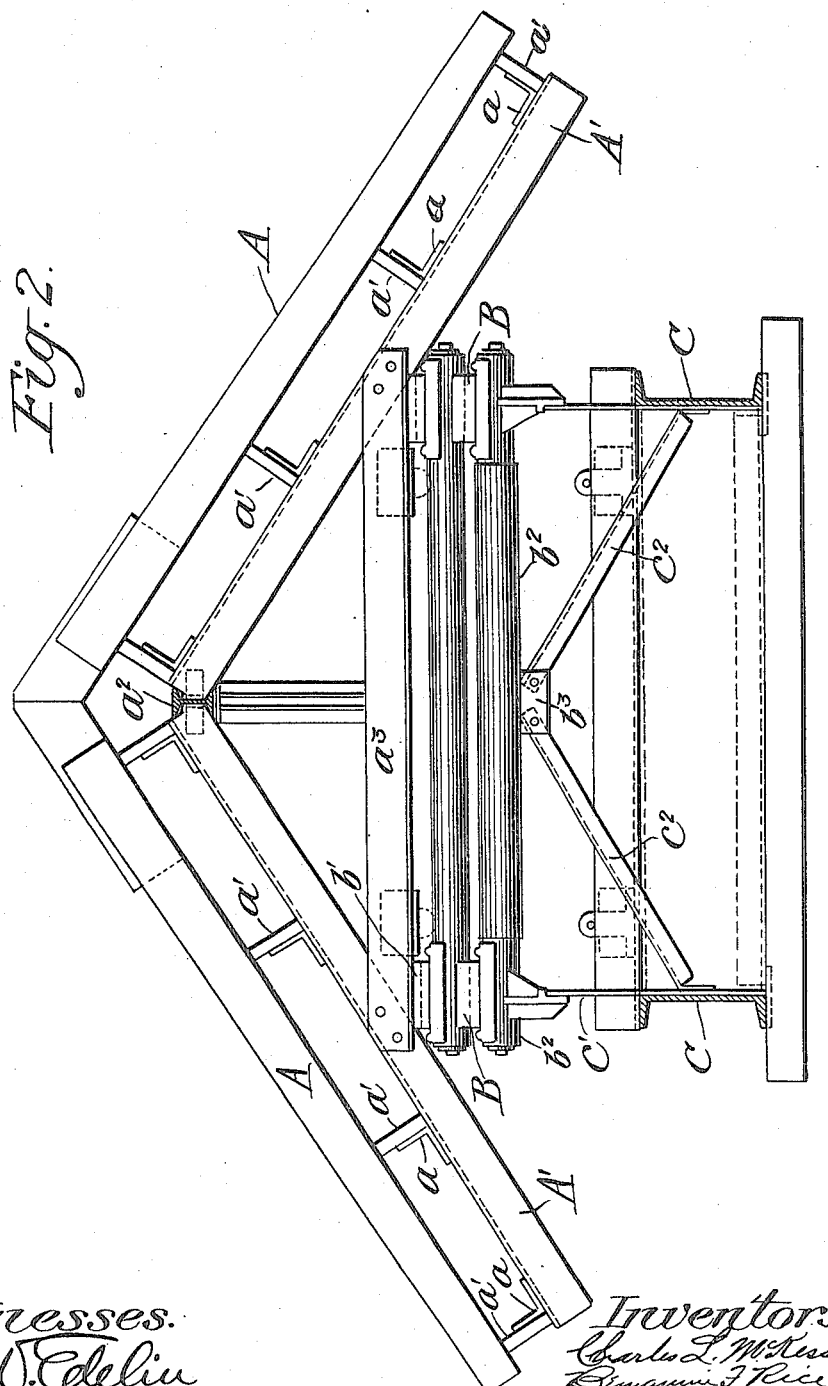

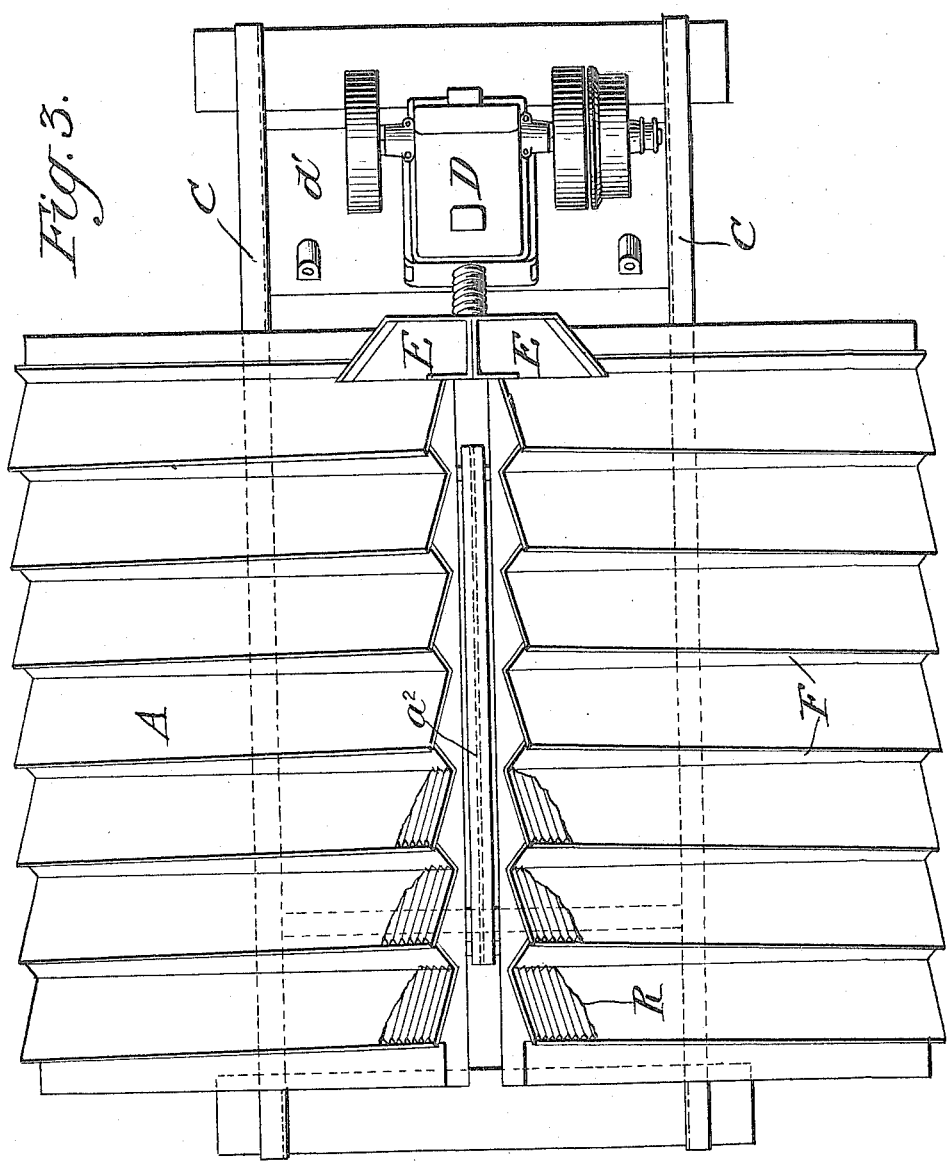

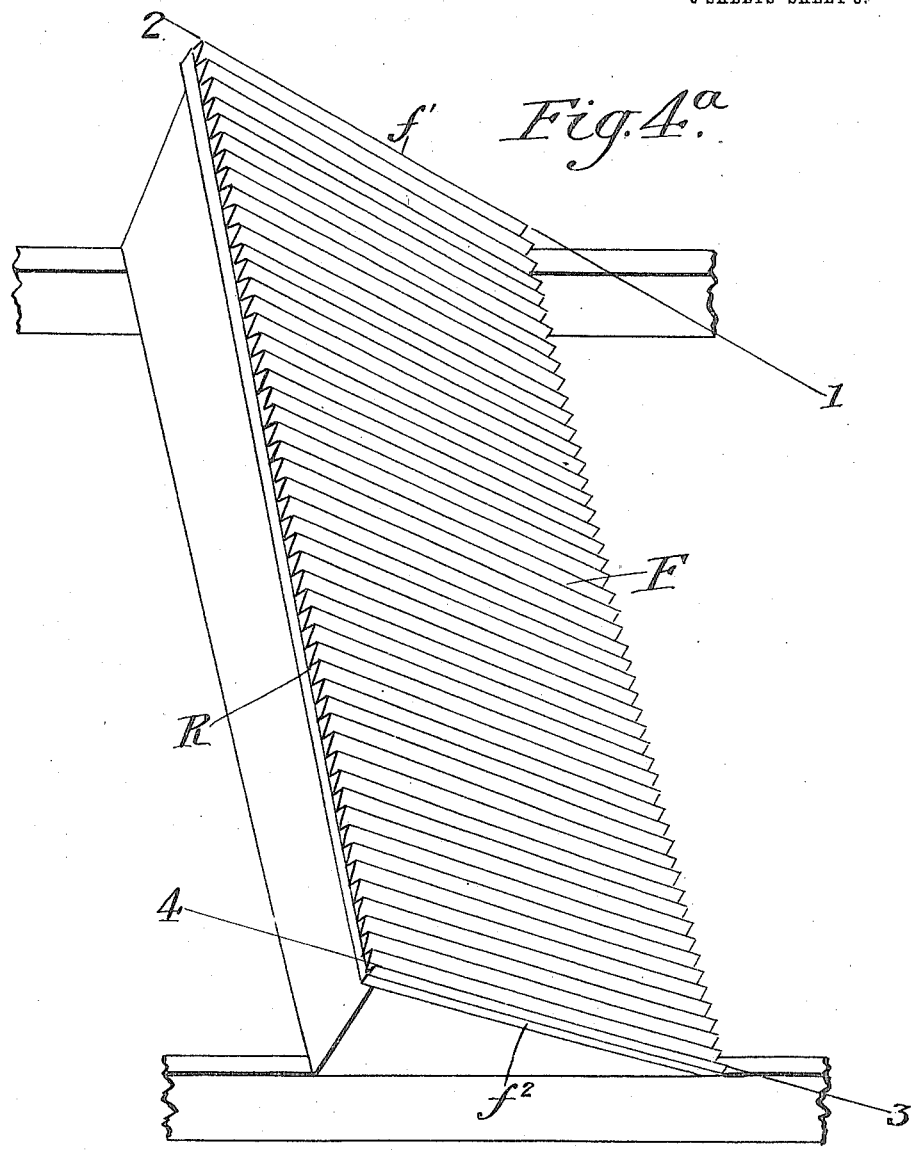

C. L. McKESSON & B. F. RICE.
APPARATUS FOR SIZING OR VOLUMETRIC GRADING OF MATERIALS.
APPLICATION FILED MAR. 10, 1914.
1,135,123.
Patented Apr. 13, 1915.
9 SHEETS—SHEET 6.
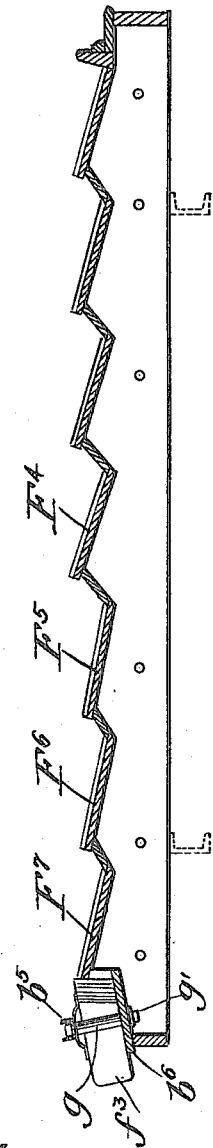
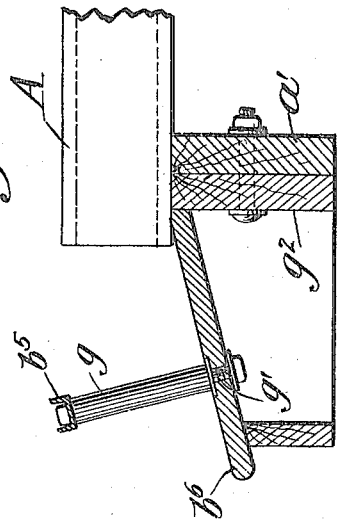
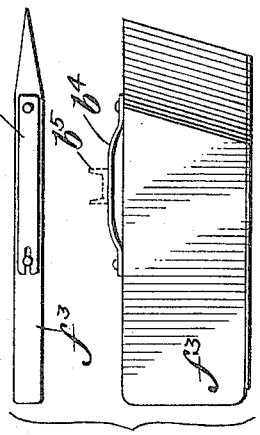

C. L. McKESSON & B. F. RICE.
APPARATUS FOR SIZING OR VOLUMETRIC GRADING OF MATERIALS.
APPLICATION FILED MAR. 10, 1914.
1,135,123.
Patented Apr. 13, 1915.
9 SHEETS—SHEET 7.
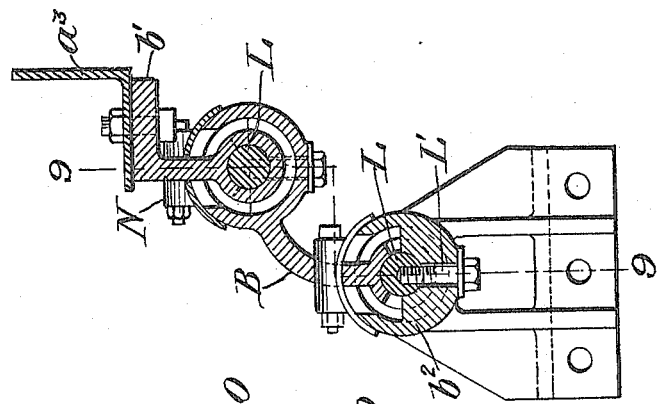
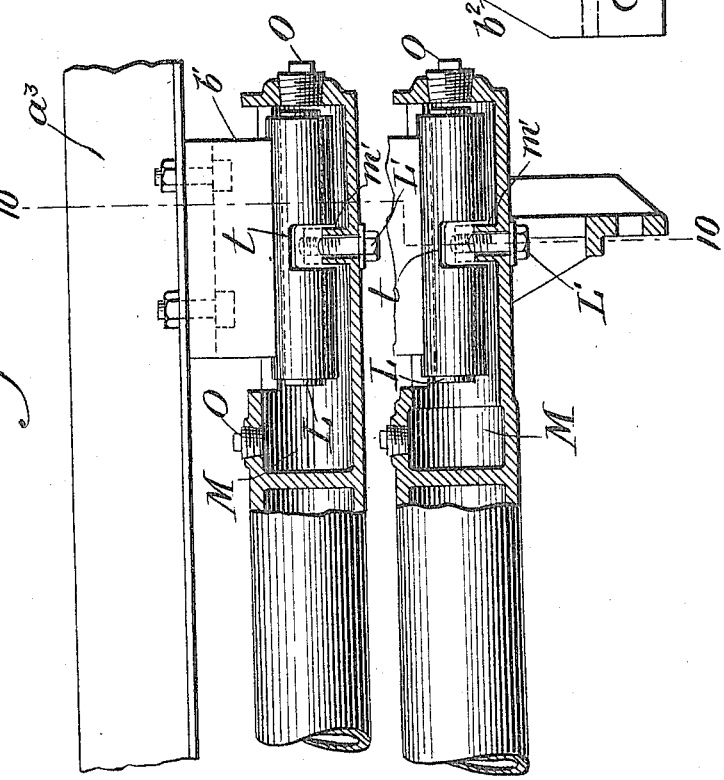

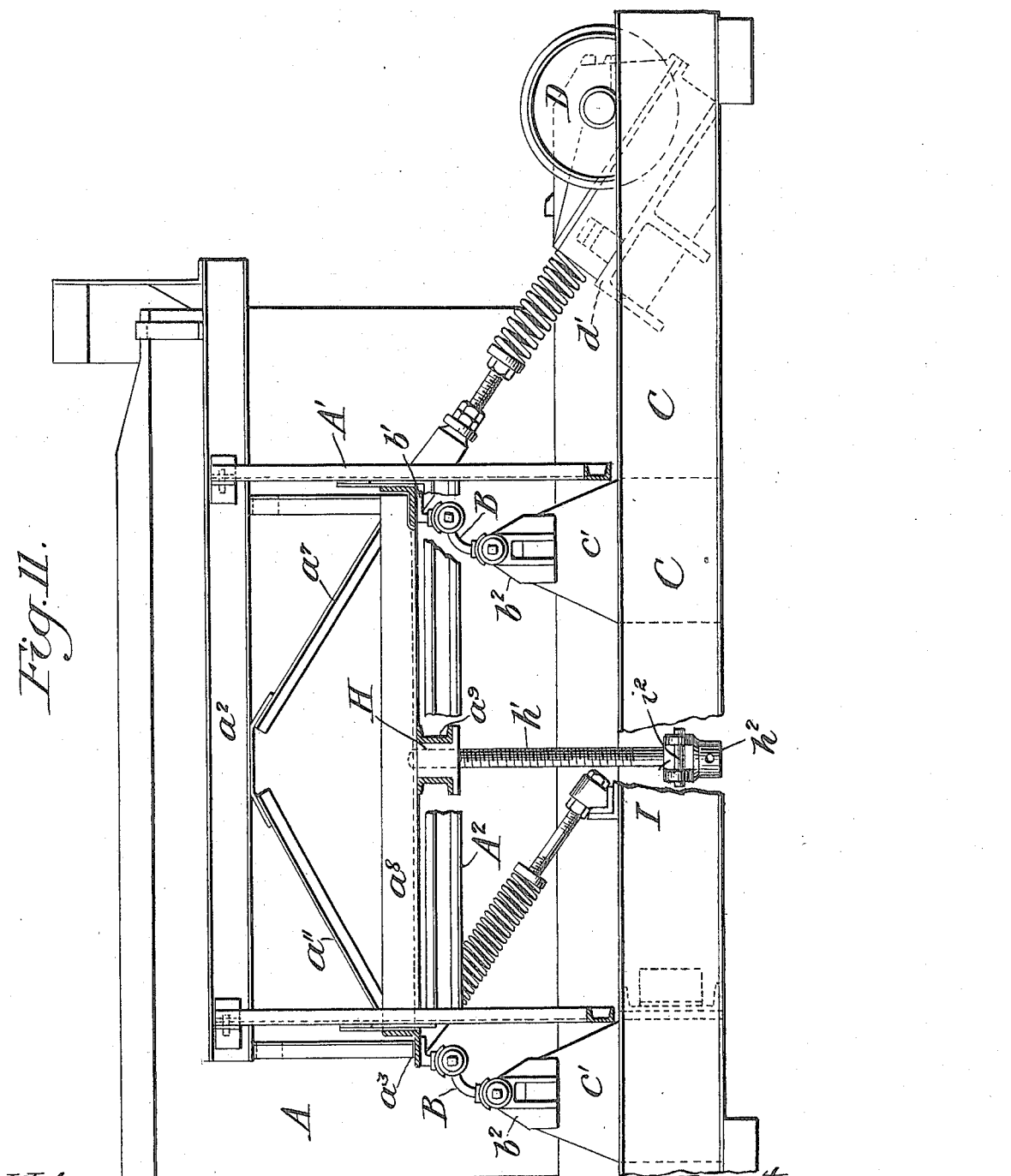

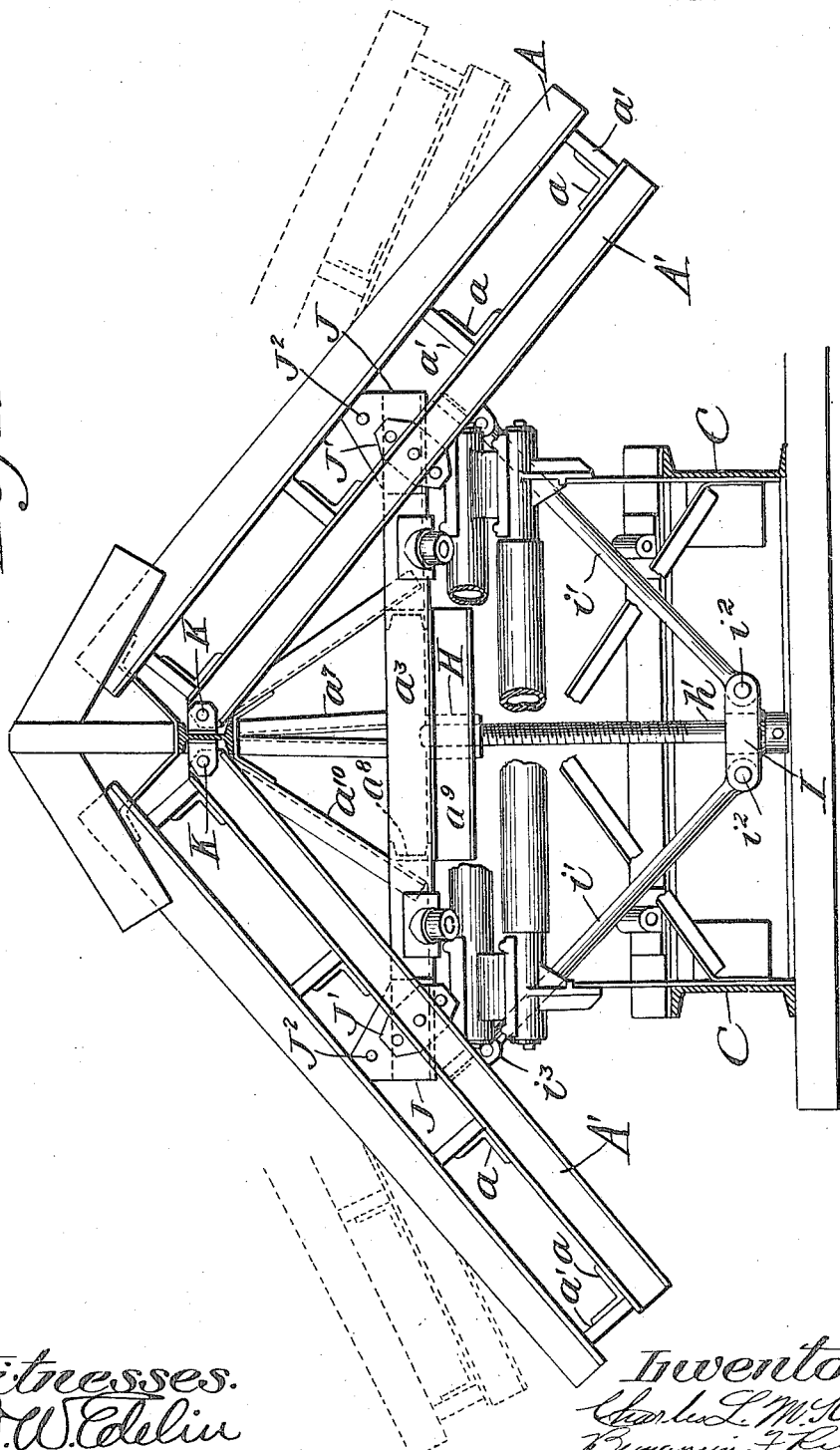

UNITED STATES PATENT OFFICE.

CHARLES L. McKESSON, OF COLORADO SPRINGS, AND BENJAMIN F. RICE, OF DENVER, COLORADO.

APPARATUS FOR SIZING OR VOLUMETRIC GRADING OF MATERIALS.

1,135,123.

Specification of Letters Patent.

Patented Apr. 13, 1915.

Application filed March 10, 1914. Serial No. 823,738.

*To all whom it may concern:*

Be it known that we, CHARLES L. McKESSON and BENJAMIN F. RICE, both citizens of the United States, residing at Colorado Springs, in the county of El Paso and State of Colorado, and Denver, in the county of Denver, State of Colorado, respectively, have invented certain new and useful Improvements in Apparatus for Sizing or Volumetric Grading of Materials; and we do hereby declare the following to be a full, clear, and exact description of the invention, such as will enable others skilled in the art to which it appertains to make and use the same.

The present invention relates to apparatus for grading or sizing solid material according to the volumes of the different bodies, ranging from material in pulverulent form to material comprising sections or pieces of large size, the object being to deliver all materials of whatever nature or character, having the same volume or size, together, without respect to the weights or specific gravities of the respective materials.

Our prior Patent, No. 1,044,067, issued November 12, 1912, which discloses a sizer of the foregoing character, relates to the apparatus in general and the method carried out thereby.

The present invention relates more particularly to the specific construction of certain parts of the sizer disclosed in said patent and also to the improvements to be hereinafter described.

The invention is illustrated in the accompanying drawings, in which:—Figure 1 is a side view of the improved separator with one of the separating decks removed to show the supporting and operating mechanism for the decks; Fig. 2 is an end elevation of the improved separator with the cutters and cutter plate removed; Fig. 3 is a plan view of the construction shown in Fig. 2; Fig. 4 is a plan view of one of the separating decks showing the cutters in place; Fig. 4ª is a perspective detail view of one of the deflectors employed; Fig. 5 is an end view of the construction shown in Fig. 4; Fig. 6 is a sectional view of one of the separating decks taken on the line 6—6 of Fig. 4; Fig. 7 is a detail view representing a side elevation and top plan view of the cutter; Fig. 8 is a broken sectional view taken on the line 8—8 of Fig. 4; Fig. 9 is a broken sectional view of one of the supporting links taken on line 9—9 of Fig. 10; Fig. 10 is a sectional view taken on the line 10—10 of Fig. 9; Fig. 11 is a side elevation corresponding to Fig. 1 but representing a modified form of the apparatus in which an adjustment is provided for changing the lateral inclination of the separating decks; and Fig. 12 is an end view of the construction shown in Fig. 11 showing an adjusted position of the separating decks in dotted lines.

Throughout the various views, like reference characters refer to corresponding parts.

Referring particularly to Figs. 1, 2 and 3 of the drawings, in which the commercial form of the apparatus is illustrated, the separating decks are denoted generally by the reference character A, said decks being made of any desired material, such as wood or metal, and being of rigid construction. The decks A are rigidly bolted or otherwise secured to suitable channel bars A', one being preferably located at or near each end of each deck. In the preferred form, the longitudinal ribs $a'$ of the decks A are supported on the channel bars A' and rigidly secured thereto by the angle members $a$. The upper ends of the channel bars A' are connected to a longitudinal I-beam $a^2$, so that the decks A and channel bars A' slope downwardly on either side of the I-beam $a^2$ to form a gable-like structure. Connecting the intermediate points of the oppositely disposed but corresponding channel bars A' are suitable cross braces $a^3$, preferably of angle form, one face of the angle being rigidly connected to the channel bars A', as clearly shown in Figs. 1 and 2. In order to properly space the channel bars A' in a longitudinal direction, tubular pipe members $a^4$ are provided interconnecting the channel bars A' and through which a rod $a^5$ passes, each end of which may be threaded and passed through the channel bars A' to accommodate a nut, in order to secure the rod $a^5$ to the channel bars A'. The tubular member $a^4$ serves to space the channel bars A' and to hold the same in proper relation.

The extremities of the cross braces $a^3$ are supported on castings $b'$ which are adapted to be secured to the under face of the horizontal portion of the angle brace $a^3$, said castings $b'$ being hingedly connected by means of the links B to castings $b^2$, which in turn are securely connected to the standard $c'$ riveted or otherwise secured to the base channel supports C. Rigid braces $c^2$ are preferably provided which are secured to a lug $b^3$ provided on the casting $b^2$ and extend diagonally down to channel supports C to which they are rigidly connected.

A base plate $d'$ is provided, which interconnects two adjacent extremities of the channel supports C, and is rigidly secured thereto. The said base plate serves as a support for the head motion D which imparts the desired motion to the separating decks by means of a connecting rod $d^2$, one end of which is connected to the reciprocating yoke of the head motion, and the other end to a casting $d^3$. The casting $d^3$ is secured to one of the cross braces $a^3$, from which point two diagonal braces $a^6$ preferably extend to the other cross brace $a^3$ and are connected to the latter at points directly above the connection with the castings $b'$. Another brace $a^7$ is preferably provided which extends from the point of connection of casting $d^3$ and brace $a^3$ to the I-beam $a^2$, said brace $a^7$ being substantially in alinement with the connecting rod $d^2$.

The connecting rod $d^2$ is preferably threaded as shown in Fig. 1 to permit of an adjustment, and is connected to the casting $d^3$ by means of a ball and socket connection to allow for automatic alinement of the connecting rod.

Figs. 9 and 10 show in detail the construction of the links B. The upper extremity of the link B and also the casting $b^2$ are provided with a housing M, the top portion of which is open to allow for the entrance of the lower portions of the castings $b'$ and B, respectively. The lower extremities of the castings $b'$ and B are preferably cylindrical shape, as shown, and are bored out to admit the shafts L. At a central point in the length of the castings $b'$ and B, indicated by $t$, an opening is provided to accommodate the saddles $m'$ formed in the lower portion of the housings M. The shafts L are tapped at a central point to admit the cap screws $L'$ which pass through an opening provided in the saddles $m'$ and secure the shafts L in position. Dust caps $N'$ constitute closures for the openings formed in the top of castings B and $b^2$. Plugs O may be provided in the end of the housings M and in the upper portion thereof, which, when removed, permit the housings M to be filled with lubricant.

In the form of the apparatus illustrated in Figs. 11 and 12, an adjustment is provided for changing the lateral inclination of the decks A. The general construction of the apparatus illustrated in these figures is substantially the same as that hereinbefore described, except in the present form, channel supports $a^8$ are provided instead of the spacers $a^4$ and cross pieces $a^5$. Said channel supports $a^8$ are rigidly secured to the channel bars $A'$ at points directly over the connection between said channel bars $A'$ and the links B. Interconnecting the cross supports $a^8$ at points intermediate the ends of the latter are channel bars $a^9$, in the center of which is secured a threaded casting H. A threaded adjusting rod $h'$ coöperates with the casting H and is provided at its lower end with a shoulder $h^2$ abutting a collar I, which may be actuated in a vertical direction by turning the adjusting rod $h'$. The collar I is provided on opposite sides thereof with suitable lugs to which elevating rods $i'$ are pivotally connected by means of pins $i^2$. Cross supports $A^2$ interconnect corresponding points of the two channel bars $A'$ on each deck, said points being slightly below the center of said channel bars $A'$. The cross supports $A^2$ are provided at their central points with lugs $i^3$ to which the upper ends of the elevating rods $i'$ are pivotally connected.

At the points of connection between the channel bars $A'$ and the cross braces $a^3$, plates J are provided secured to the extremities of the brace $a^3$, and plates $J'$ are provided secured to the channel bars $A'$. The said plates are provided with a plurality of perforations $J^2$ formed on an arc of a circle whose center is at the point K where the channel bar $A'$ is hingedly connected to the I-beam $a^2$ instead of being rigidly connected thereto, as in the construction previously described. By turning the adjusting rod $h'$ in the casting H, the elevating rods $i'$ are forced upwardly, thus serving to actuate the channel bars $A'$, and consequently, the separating decks about the points K as centers. The channel bars $A'$ are held in fixed relation to the cross braces $a^3$ when the desired adjustment is obtained by passing suitable bolts or pins through the registering perforations in the plates J and $J'$.

In order to further brace the construction, bracing elements $a^{10}$ are preferably provided at each end of the construction secured at their upper ends to the I-beam $a^2$ and at their lower ends to the cross brace $a^3$. Another extra brace $a^{11}$ is preferably provided in the present form corresponding to the brace $a^7$ secured to the under surface of the I-beam $a^2$ and to the central part of the rear brace $a^3$.

The head motion D is described in detail in the above-mentioned Patent, No. 1,044,067, so that for the purpose of the present application, it will be sufficient to state that said head motion imparts a reciprocating motion to the separating decks, and due to the links B which have a normal inclination toward the head motion D, will impart to the table or deck simultaneously with its reciprocating motion, a rising and falling motion, the rising motion being limited to the first half or forward portion of the reciprocation of the table, while the falling motion transpires during the return half of the reciprocation.

The separating decks are provided on their upper surface with a plurality of deflectors F, as clearly shown in Figs. 4, 4ª and 6, said deflectors being constituted by a series of inclined surfaces $F^4$, $F^5$, $F^6$, $F^7$, etc., juxtapositioned with respect to the longitudinal axis of the decks and running transversely of the decks from the apex of the gable-like structure to the lower edges of the decks.

In the aforementioned Patent, No. 1,044,067, the surface of the separating deck is provided with a plurality of similar deflectors successively increasing in inclination toward the rear or discharge end of the deck. In said patent, each deflector is provided with a series of corrugations or ridges successively increasing in pitch from the top of the deflector to the lower edge thereof. The underlying principles involved in such construction are fully enumerated in said patent, suffice it to say for the present purposes, that the unsized material delivered to the separating deck at that corner thereof where the inclination of the deflectors was the smallest would be subjected to the combined reciprocating and rising and falling movement of the deck, and due to the deflectors of successively increasing inclination, the coarser particles are caused to take more direct paths toward the lower edge of the deck than the finer particles, due to the fact that the component of gravity acting on the larger particles is greater than that acting on the finer particles at a given inclination of the deflector at any point. The projecting pulsations or propulsive forces transmitted to the deck will therefore not force the larger particles up the incline at said point unless such propulsive force is greater than the component of gravity tending to pull the particle down the incline. It will be apparent, however, that propulsive forces which are not sufficient to cause the coarser particles to ride over the incline may be sufficient to cause a smaller particle to pass up the same incline, due to the fact that the component of gravity acting upon the same is not as great as that acting upon the larger particle. As fully explained in the patent above referred to, the smaller particles of the material delivered at the upper corner of the deck will tend to travel in a more direct path across the deck, that is longitudinally of the same, since for the given projecting pulsations, the smaller particles can be made to climb steeper inclines than the larger particles. The larger particles will travel in a somewhat direct path longitudinally of the deck until a deflector is reached having a sufficient incline to cause the component of gravity acting upon the particle to be equal to or greater than the projecting pulsation, whereby the said large particle will be stopped in its movement longitudinally of the deck, and will move in parallel relation to the deflector and report with particles of the same size at the foot of the deflector. Due to the provision of the corrugations or ridges of successively increasing pitch on each deflector of the construction shown in said patent, the particles will travel toward the lower edge of the deck until a corrugation is reached of sufficient pitch to arrest the motion of the particle toward the lower edge of the deck. By properly proportioning the deflectors and the ridges or corrugations on the respective deflectors, a perfect gradation of the material is obtained along the lower edge of the deck and the rear edge of the same.

As above stated, the underlying principles of a separator or sizer of the present type have been carefully explained in our prior Patent, No. 1,044,067, and the brief review of the principles described above is for the purpose of making it clear how the construction of each individual deflector of the present application, as hereinafter described, serves to make the operation of the entire separator more efficient.

As shown in Fig. 4ª, each deflector is so formed that the inclination at the upper end of the deflector is greater than that at the lower end thereof. It will be noted that the transverse pitch of the deflector F in Fig. 4ª from point 1 to point 2 is greater than that from point 4 to point 3, and that the transverse pitch gradually decreases toward the lower end of the deflector. Otherwise stated, the inclination gradually decreases from the top edge $f'$ of the deflector to the lower edge $f^2$ thereof.

The principle of the entire separator is therefore carried out in each and every individual deflector. Due to the gradually decreasing inclination of each deflector, successively larger particles will be permitted to pass over the edge of the deflector, as the lower portion thereof is reached, and a gradation of the material is therefore obtained along each lateral edge of the deflector in the same way that the total gradation of the material is obtained by the entire separator.

By the use of a deflector of the foregoing character, it is possible to obtain a gradation of the material over the higher edge of the last deflector in the series, thereby permitting of a decrease in the number of deflectors required, and a consequent decrease in the size of the entire separating deck.

If desired, the surfaces of the deflectors may be provided with the corrugations or ridges R similar to those disclosed in our prior patent aforesaid.

Adjustable cutters, $f^3$, are provided along the lower and rear edges of the separating decks A, said cutters being held in position by means of a spring $b^4$, (Fig. 7), secured to the top edge of the cutter, said springs serving to contact with the lower edge of the channel bar $b^5$.

Referring to Fig. 8, it will be seen that the channel bar $b^5$ is suitably positioned by spacers $g$ through which a suitable bolt $g'$ passes and which is secured to the channel bar $b^5$ and the base board $b^6$. The edge $g^2$ of the cutter frame is preferably bolted to the rib $a'$ of the deck A.

Fig. 6 shows the position of the cutters with respect to the separating deck A and to the deflectors thereon. As the character of the present type of deflector causes two products of different sized particles to be discharged from the bottom of each deflector, the cutters are arranged with one intermediate the lateral edges of each deflector, as clearly shown in Fig. 4.

From the foregoing construction, it will be obvious that the unsized material introduced to the separating decks at the feeders E will be distributed over the face of each deck, and due to the principles of operation hereinbefore described, will be sized and collected at the lower and rear edges of the separating decks, the specific construction of the deflectors serving to increase the efficiency of the machine, due to the fact that each and every one of said deflectors serves as a separator in itself.

Due to the adjustments hereinbefore described, the inclination of the separating decks may be adjusted to suit different requirements in a simple and efficient manner without destroying the rigidity of the construction.

What we claim is:—

1. In a machine for sizing solid materials, a laterally inclined separating deck having a plurality of adjacent inclined surfaces each being inclined upwardly from the front end of the machine toward the rear or discharge end thereof and adapted to discharge material over its higher edge on to the succeeding surface and each of said surfaces gradually decreasing in inclination from the top edge to the bottom edge of the deck, and means to feed material to the deck.

2. In a machine for sizing solid materials, a laterally inclined separating deck, a plurality of adjacent deflectors associated therewith, said deflectors comprising inclined surfaces disposed transversely of the deck and being inclined upwardly from the front to the rear of the machine and each of which is adapted to discharge over its higher edge on to the succeeding deflector, said deflectors being of greater inclination at the top edge of the deck than at the bottom edge thereof, and means to feed material to the deck.

3. In a machine for sizing solid materials, a laterally inclined separating deck having a plurality of adjacent inclined surfaces, each being inclined upwardly from the front end of the machine toward the rear or discharge end thereof and adapted to discharge material over its higher edge on to the succeeding surface and each of said surfaces gradually decreasing in inclination from the top edge to the bottom edge of the deck, means to feed material to the deck, and means to change the lateral inclination of the deck.

4. In a machine for sizing solid materials, a pair of laterally inclined separating decks mounted in hinged relation at their upper edges, said decks having a plurality of adjacent inclined surfaces, each being inclined upwardly from the front end of the machine toward the rear or discharge end thereof and adapted to discharge material over its higher edge on to the succeeding surface, and each of said surfaces gradually decreasing in inclination from the top edge to the bottom edge of the deck, means to feed material to the decks, and means to adjust the lateral inclination of the decks.

In testimony whereof we affix our signatures, in presence of two witnesses.

CHARLES L. McKESSON.
BENJAMIN F. RICE.

Witnesses:
A. J. LAWTON,
B. A. BRIGGS.

Copies of this patent may be obtained for five cents each, by addressing the "Commissioner of Patents, Washington, D. C."